United States Patent [19]
Carlebarch

[11] Patent Number: 5,946,426
[45] Date of Patent: Aug. 31, 1999

[54] EFFICIENT UPWARD RASTER CONVERSION OF ROTATED IMAGES

[75] Inventor: Ephraim A. Carlebarch, Raanana, Israel

[73] Assignee: Scitex Corporation Ltd., Herzliya, Israel

[21] Appl. No.: 08/838,996

[22] Filed: Apr. 23, 1997

[30] Foreign Application Priority Data

May 3, 1996 [IL] Israel ....................................... 118137

[51] Int. Cl.⁶ ........................................................ G06K 9/32
[52] U.S. Cl. ............................ 382/299; 382/296; 395/109
[58] Field of Search ................................. 382/299, 296, 382/298, 245, 300; 348/441; 395/109; 345/132, 127

[56] References Cited

U.S. PATENT DOCUMENTS

| | | | |
|---|---|---|---|
| 4,345,245 | 8/1982 | Vella et al. | 345/25 |
| 5,315,691 | 5/1994 | Sumiya et al. | 395/109 |
| 5,581,635 | 12/1996 | Zhu et al. | 382/245 |
| 5,585,863 | 12/1996 | Hackett et al. | 348/716 |
| 5,696,848 | 12/1997 | Patti et al. | 382/254 |

*Primary Examiner*—Leo H. Boudreau
*Assistant Examiner*—Ishrat Sherali
*Attorney, Agent, or Firm*—Mark M. Friedman

[57] ABSTRACT

A method and system for efficiently rotating an image in a first raster, by any angle, onto a second raster of much higher resolution, and also for generating a page image in a high-resolution raster from a plurality of contone images, input in lower resolutions, with arbitrary orientation angles. The system uses serially organized buffer memories to store input pixels relevant to a group of output raster lines at a time and calls for repeatedly reading out the values in sequence, once for each line of the group, and selecting the relevant values on the fly. More specifically, pixels are stored in two buffer memories, corresponding to two lines straddling the back-mapped group, and values are selected between their respective readout streams according to which elementary pixel areas each back-mapped raster line traverses. Concurrently the segment lengths of such traversal are computed and paired with the selected pixel values.

14 Claims, 10 Drawing Sheets

CONVENTIONAL ROTATE

EFFICIENT UPWARD RASTER CONVERSION OF ROTATED IMAGES

FIELD AND BACKGROUND OF THE INVENTION

The present invention relates to digital systems for preparing page images for print and, more particularly, to a method and apparatus for converting one or more contone images from their native raster representation into a representation in terms of the output image raster in any desired position and angular orientation.

In the process of digitally preparing images for quality printing, there frequently occurs the general task of preparing a composite page image, consisting of text and a plurality of component images, out of a plurality of given images.

The digital representation of the final, or output, page image is normally based on a cartesian raster with a relatively high resolution, i.e. spatial-, or line- frequency— typically 1000–4000 lines per inch. In general practice, the raster is modeled as consisting of parallel lines, spaced at that spatial frequency, which lines usually correspond to the actual lines being traced by, say, a light beam when writing the image onto a plate. These parallel lines will be referred to hereunder as output raster lines, or, for short, raster lines or lines (when referring to output raster). For ease of presentation it will be assumed hereunder that the output raster lines are horizontal; it is, however, appreciated that the invention and the description applies equally well, with obvious modifications, when raster lines are in other directions. The final page image is usually represented as a sequence of short segments along each raster line, each segment being characterized by its length (so-called runlength) and by a value. The value may be either explicitly a tone value (as is usual for CT) or a reference to a table of tone values (as is usual for LW). Where the page image contains no component a blank (nonprinting) tone value is specified.

The given images are of two general types—linework (LW) and continuous-tone (CT or contone). Linework images are characterized by relatively high resolution (usually the same as the final page image) and indirect specification of tone values, while contone images have relatively low resolution (typically 300 lines per inch) and direct pixel-by-pixel specification of tone values.

It is noted that throughout the present discussion and the description of the invention the term tone value refers to any measure of darkness or lightness, such as density, of either a monochromatic image or any one color separation of a color image. It is also noted that in the context of the invention and the present discussion the digital representation of the page image (also referred to herein as the output image) is in terms of tone values and that in most systems this representation subsequently undergoes a process of screening, as is well known in the art.

The various component images are placed in the composite page image in specified positions. Quite often, linework images serve, inter alia, to define sharp boundaries of contone image components; such boundaries may be between the contone component and the background or between a contone component and the corresponding linework component or between abutting contone components.

A given (or input-) contone image is also normally based on a cartesian raster, but one that is generally modeled as a two-dimensional regular array of discrete points, at which points, usually referred to as pixels, the image is represented by tone values. The image is usually thus defined within a rectangular bounding window, whose edges are parallel to the raster's coordinate axes; the area within this window will also be referred to hereunder as the (input-) image area. As noted above, the resolution of the input image, which is the spatial frequency of its array points along one coordinate direction, is much lower than that of the output image; typically it is 200–400 lines, or pixels, per inch. Also to be noted is that when the given image, with its bounding window, is mapped into the output image, its orientation may be different, i.e. inclined at some specified angle, A (to correct for skew during scanning or to effect a rotated component in the composite image); that is, the horizontal edge of the bounding window, mapped into the output image, generally forms an angle A with respect to the horizontal axis of the output raster.

It is further noted that each input image may have a different resolution and a different angular orientation. The pixel values of each input image are stored in any convenient format, but each pixel value is always retrievable upon supplying its position within the raster's array.

The process of generating the output page image thus includes two tasks that generally require extensive computation and therefore are problematic—

(1) conversion of the contone image from its given raster representation into the output raster representation, while angularly re-orienting it, and (2) switching between, or combining, data from the given images to form the output image representation.

The first task involves overcoming the raster differences noted above, in effect orienting the contone images correctly with respect to the output raster and assigning the tonal value of each input pixel to appropriate segments of a plurality of output lines. The second task involves interleaving data (i.e., value/runlength pairs) from the various given images along each output raster line and modifying the runlength values at boundaries between output image components.

Two widely known and practiced imaging models currently serve to govern the carrying out of these tasks. One lies at the basis of the Postscript language and is specified, for example, in the Postscript Language Reference Manual, 2nd edition, by Adobe Systems Inc., Addison-Wesley Publishing Co., 1990; the other is generally adopted in so-called high-end color electronic prepress systems (CEPS), as reflected, for example, in the international standard CD-12639 for Graphic technology—Prepress digital data exchange—Tag Image File Format for Image Technology (TIFF/IT), drafts of which have been circulated by ISO-TC130/WG2.

In the Postscript model, the various image components are written in sequence into a buffer memory that eventually contains the output image in its high-resolution raster representation. The components are accumulated in such a way that where they overlap, the values of a later component in the sequence replace the values of all previously written components. A contone image may be subjected to a boundary-defining mask (also known as a clipping path) prior to being written. This is how the second of the above tasks is carried out. The first task is usually accomplished by the following method [see FIG. 1]:

The given contone image area is conceptually divided into congruent rectangles 2 (usually squares), parallel to its raster grid, each rectangle assigned to one pixel and centered about its nominal position. Each output raster line to be generated is conceptually back-mapped into the coordinate system of the given contone image, oriented at an angle -A with respect to the horizontal coordinate axis (reflecting the same angular relationship within the output image, where, as noted, mapped horizontal lines are inclined at angle A), and overlaid on the grid of rectangles. A few typical lines 4 are shown in FIG. 1. All pixels over whose rectangles the back-mapped line (or portions of the back-mapped line that correspond to areas within the boundary mask) runs, are read out from the image memory in corresponding sequence and the tone value of each such pixel is assigned to the output line over a segment that corresponds to the segment that falls within that pixel's rectangle. This assignment is also gated by the data from the boundary mask. Analyzing the data flow, one realizes that if the extent of the boundary mask is large, many pixels must be read out for each output line. Moreover, for each output raster line, a different sequence of pixels must be read out, unless the orientation angle is very small (in which case a group of adjacent back-mapped raster lines may be contained within a single row of rectangles, so that the corresponding pixels need be read out only once for all the lines in that group). This is illustrated in FIG. 2, which again shows a portion of the input image overlaid by rectangles. Here, line b indicates the direction of the back-mapped output raster lines, which is at angle -A with the horizontal. Also shown are two such back-mapped raster lines 4, marked c and d, both parallel to b. The rectangles traversed by c are shown surrounded by heavy outlines 6. Line d traverses most of the same rectangles as c, avoiding a few, but also through two new rectangles, shown shaded. Thus a new sequence of pixels is required, the readout and conversion-computation of which is time consuming. Thus, the described method is disadvantageously bound by the necessity to read out and convert a new sequence of pixels for each output raster line being generated.

In the CEPS model LW components are always considered to lie on top of the CT components. Special values in the LW (so-called transparent colors) indicate areas in which an underlying CT component is to be visible; such areas in effect function as boundary masks. If there is more than one CT component, the transparent colors in the LW indicate which CT component is to be visible in each area; thus they may also serve to define boundaries between abutting CT components. A common practice is to create a pair of intermediate images, consisting of a single composite LW image and a single composite CT image. The latter is created by merging the given CT images, each such image being first rotated into its output orientation and then placed at its output position. The resolution of the composite CT remains low and the boundary between abutting components is reproduced at a low resolution version of the corresponding boundary between transparent colors in the composite LW image. This is not satisfactory for many high-quality printing applications.

According to one known improvement of the last described practice, the boundaries between abutting CT components can be defined more sharply by creating a third type of intermediate image—high-resolution contone (HRCT). The HRCT image is defined in narrow zones straddling inter-CT boundaries and represents the contone image there at LW resolution but with the whole range of CT values. The presence and use of an HRCT image obviously complicates the process and may thus be disadvantageous.

Rotation of any given CT image into the composite CT, with possible change of resolution (which is necessary when the various given images do not have the same resolution), is carried out by any of a number of methods known in the art. Typically, the positions of all pixels within the corresponding area of the composite CT are mapped back into the coordinates of the given image and their values are taken from the nearest pixel in the given image. Such a method is fast, but may give rise to distortions and artifacts. Applying interpolation produces slightly better results but requires more computations. In both cases there are obvious disadvantages.

Other models and procedures are also known in the art. They generally use methods similar to those described hereabove, in varying combinations, and thus suffer from similar disadvantages.

There is thus a widely recognized need for, and it would be highly advantageous to have, an improved method to rotate a contone image while converting it to a high resolution raster representation. There also is a need for an improved system to digitally generate composite images in output raster representation, from any given linework images and contone images. It is the goal of the present invention to provide such a method and such a system.

SUMMARY OF THE INVENTION

The present invention successfully addresses the shortcomings of the presently known configurations by providing a method and apparatus for economically, and at very high speed, raster-converting rotated contone images and concurrently assembling them into an output page image, one output raster line at a time.

The present invention discloses a novel system for digitally generating a page image in output raster representation, out of any digitally provided linework and contone images. More specifically, the method and apparatus of the present invention can be used to raster-convert contone images, with rotation, and to compose an output page from a plurality of contone- and linework images with sharp demarkation lines therebetween, all in a single process, at very high speed and with commercially available hardware components.

According to the present invention there is provided a method for converting a digital representation of an image from a first raster into a second raster, the representation in the first raster being in terms of pixel values at pixel positions forming points in a two-dimensional array, the representation in the second raster being in terms of pixel values along parallel raster lines, the resolution in the second raster being substantially higher than the resolution in the first raster and the orientation of the image in the second raster being at any angle A with respect to the orientation of the image in the first raster, the method comprising the steps of—

(a) determining the pixel positions in the first raster that correspond to a group of adjacent raster lines of the second raster;

(b) retrieving the values of the pixels whose positions were determined in step (a) and storing the retrieved values in serially organized buffer memories; and (c) for each raster line of the group of adjacent raster lines, reading out the stored values from the buffer memories in sequence and selecting from the thus read out stored values those values that correspond to the raster line.

According to further features in preferred embodiments of the invention described below, wherein the two-dimensional array is a regular cartesian array, the group of adjacent raster lines is selected so that, when back-mapped into the first raster, the group of adjacent raster lines is straddled by a pair of master points formed by identically displacing any pair of diagonally adjacent points of the array and step (a) includes the substeps of—

(i) defining over the image area in the first raster a pair of master lines parallel to the back-mapped lines and passing through the pair of master points;

(ii) dividing the image area in the first raster into a plurality of elementary rectangles with boundaries parallel to the coordinate axes of the first raster, so as to provide a one-to-one correspondence between the elementary rectangles and the pixel positions and so that each of the elementary rectangles is centered about a pixel position; and (iii) determining the pixel positions that correspond to the elementary rectangles that are traversed by each one of the pair of master lines.

According to still further features in the described preferred embodiments— step (a) further includes the substep of—

(iv) determining a sequence of directions in which each of the master lines traverses elementary rectangles and storing the sequence in a buffer memory;

the retrieved values of step (b) are stored in two of the serially organized buffer memories so that values that correspond to elementary rectangles traversed by each one of the pair of master lines are stored separately in a respective one of the two buffer memories;

and in step (c) the stored values are sequentially read out separately and synchronously from each of the two buffer memories to yield a stream of pairs of values, and the selecting of values that correspond to the raster line is effected by selecting from each of the pairs of values along the stream one value that corresponds to a respective one of the elementary rectangles traversed by the back-mapped raster line; that elementary rectangle is chosen by determining a sequence of directions in which the back-mapped raster line traverses the elementary rectangles and logically comparing this sequence with the sequence of directions stored in substep (iv) of step (a), to yield a choice for each elementary rectangle traversed by the raster line.

According to another configuration of the present invention, there is provided a method for digitally generating an output image, the output image including a plurality of contone component images corresponding to a plurality of contone input images, each input image being represented in a first raster in terms of pixel values at pixel positions forming points in a two dimensional array, the output image being represented in a second raster in terms of values along parallel raster lines, the resolution of the output image being substantially higher than the resolution of each of the input images, the orientation of each of the component images in the second raster being at any angle A with respect to the orientation of the corresponding image in the first raster and the input images generally differing from each other in their resolution and in the orientation of their corresponding component images, the method comprising the steps of—

(a) providing a key image, represented in the second raster, that contains for any segment along each raster line of the output image either a pixel value or a mask code that specifies from which one of the plurality of contone input images a pixel value should be obtained;

(b) for each contone input image and corresponding contone output image component—

(i) determining the pixel positions in the first raster that correspond to a group of adjacent raster lines of the second raster;

(ii) retrieving the values of the pixels determined in step (i) and storing the retrieved values in serially organized buffer memories; and (c) for each raster line of the group of adjacent raster lines, reading out the stored values from the buffer memories, values corresponding to various input images being read out in a sequence that reflects the sequence of corresponding ones of the mask codes along the raster line, and selecting from the thus read out stored values those values that correspond to the raster line.

The present invention also discloses apparatus for converting a digital representation of at least one image, each from a first raster into a second raster, the resolution in the second raster being substantially higher than the resolution in the first raster and the orientation of each image in the second raster being at any angle A with respect to the orientation of that image in the first raster, comprising— at least two serially organized buffer memories, preferably VRAMs, for storing values of the images;

means for serially reading out values from the buffer memories for each raster line of the second raster in a sequence that reflects the sequence of the corresponding values of the images along the raster line;

means for selecting at any time between values concurrently read out from the at least two buffer memories;

means for determining lengths of segments along lines of the second raster in sequential correspondence with values selected by the selecting means.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of an improved system for digitally generating a page image in output raster representation from any digitally provided linework and contone images. Specifically, the present invention can be used to raster-convert contone images, with rotation, and to compose an output page out of a plurality of contone- and linework images with sharp demarkation lines therebetween, all at very high speed and with commercially available hardware components.

The principles and operation of a raster converter according to the present invention may be better understood with reference to the drawings and the accompanying description.

Figure 1:
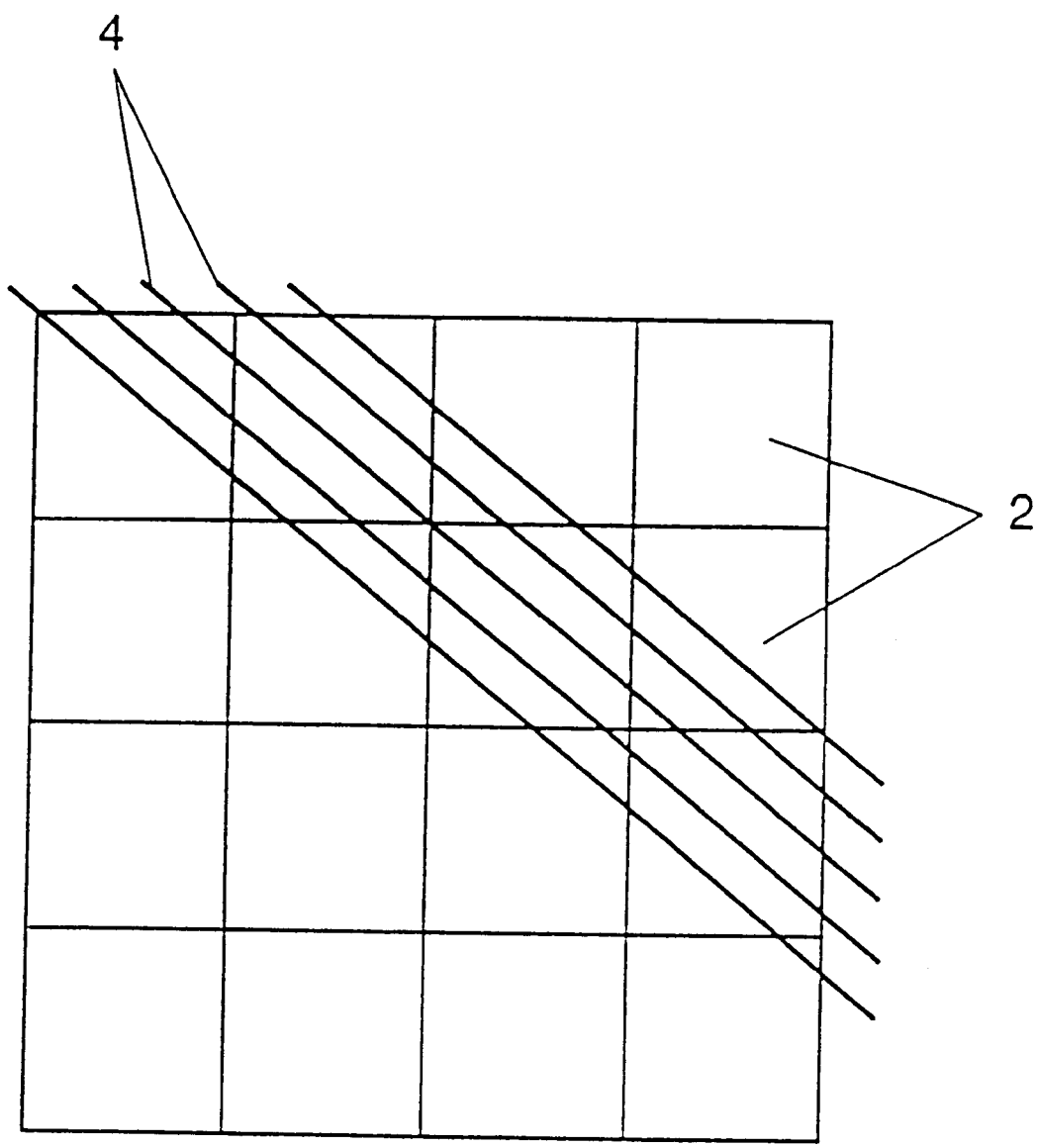
FIG. 1 is an illustration of input image-plane geometry for a conversion method according to prior art.
Figure 2:
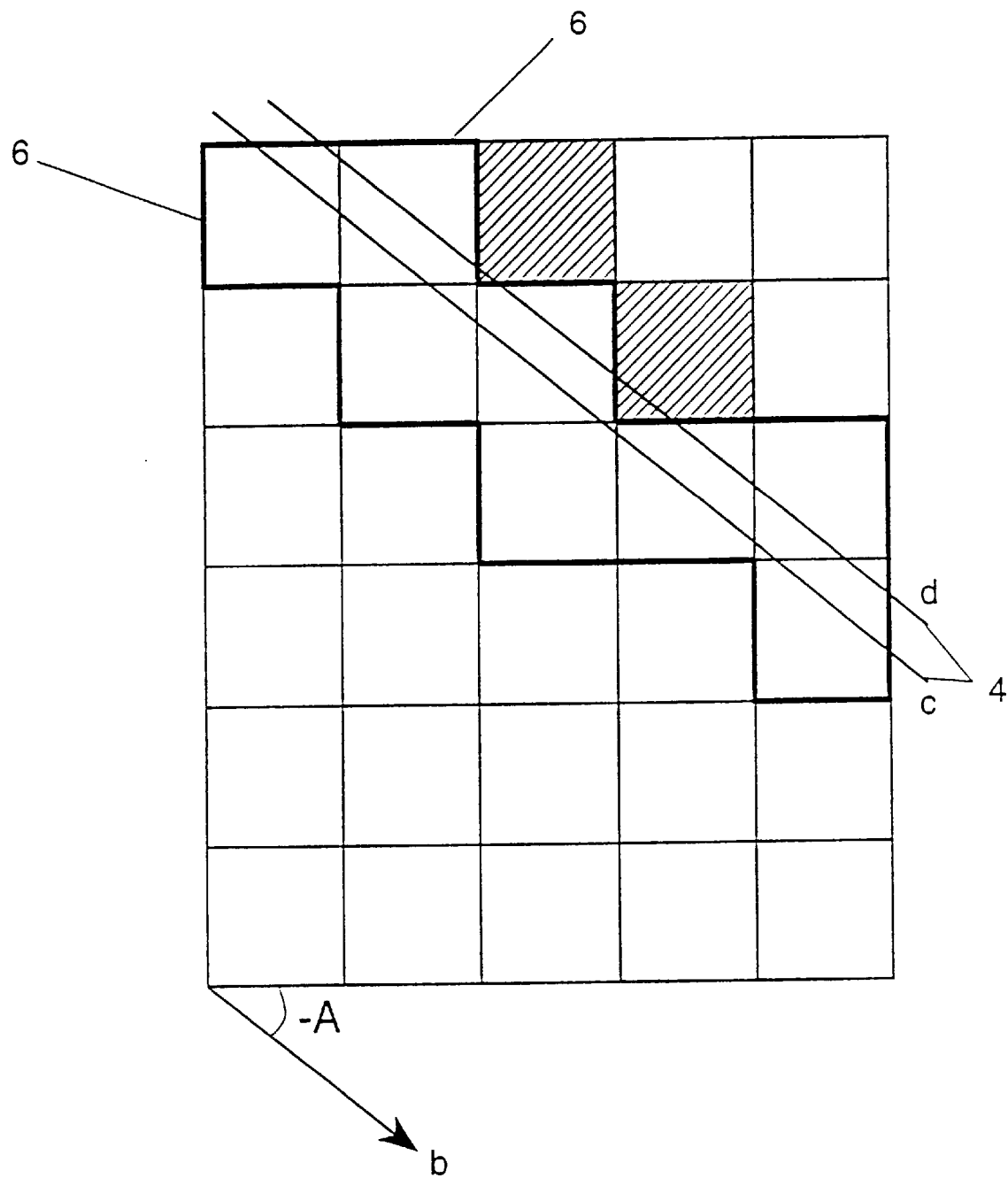
FIG. 2 is a detailed illustration of image-plane geometry for a conversion method according to prior art.
Figure 3:
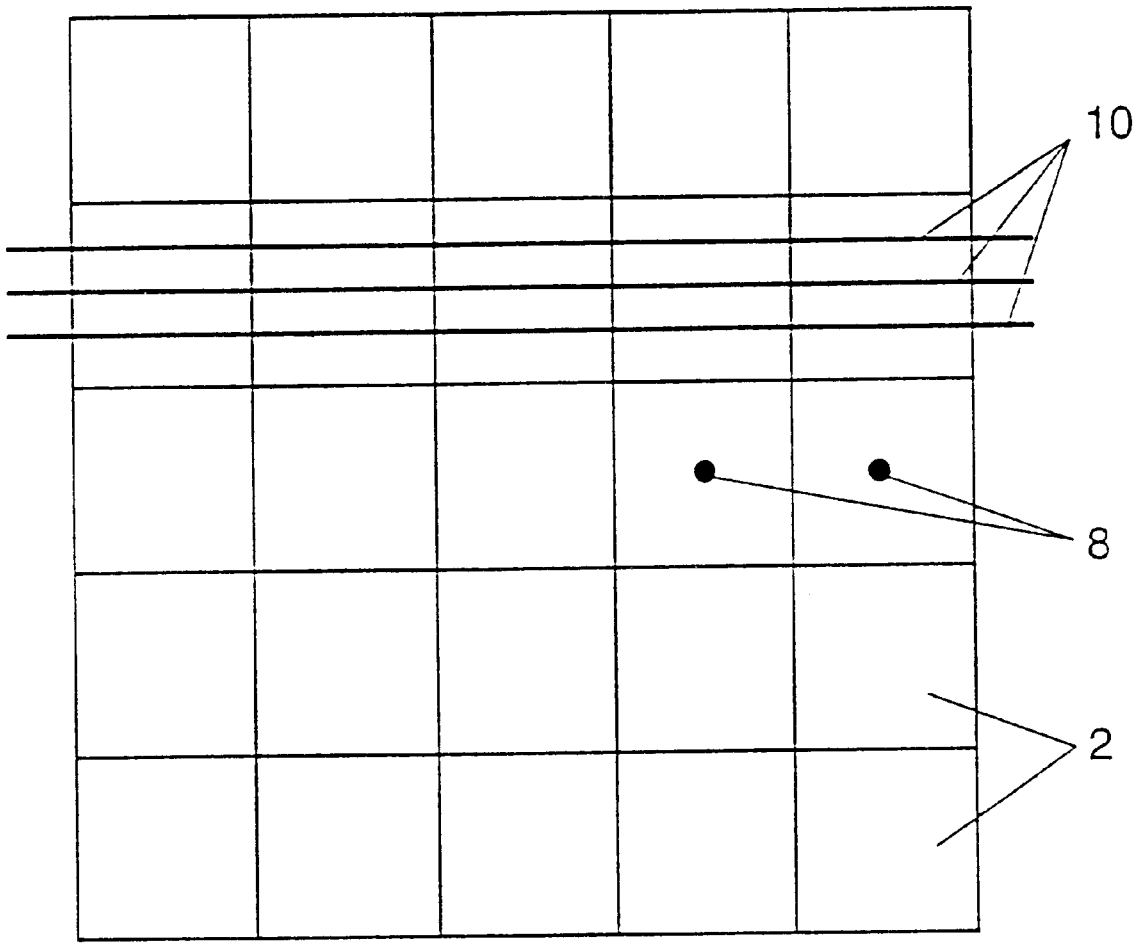
FIG. 3 is an illustration of input image-plane geometry for a conversion method according to the present invention for a no-rotation case.

Reference is first made to FIG. 3, which illustrates a portion of a contone image window in its given orientation. More specifically, it depicts the region of the lower left corner of that image window, that corner assumed to be the origin of the window's coordinates. The image area is seen again to be divided into equal rectangles 2 (which in this instance, as is also typically the case, are actually squares). The center 8 of each such rectangle is considered to be the nominal position of a pixel and there is indeed a one-to-one correspondence between the rectangles and the pixels of the image when placed at their nominal positions within the array. Each rectangle represents the region over which the value of the corresponding pixel is generally considered valid for the input image. First, the case that this image is to be merged into the output image unrotated is considered. Back-mapping output raster lines into the image depiction of FIG. 3 results in horizontal lines, such as denoted by 10. Clearly, to generate the corresponding region of the output image, the value of a pixel would be assigned to a segment of each of a number of output raster lines, namely—a segment whose back-mapped version spans the width of the corresponding rectangle and the raster lines being those whose back-mapped versions fall within the height of that rectangle. In other words, each pixel in effect results in a rectangular (or square) section of the output raster rendered in a tone specified by that pixel's value.

It should be noted here that, as is generally known, before an image is finally rendered to become a printing image for inherently binary printing processes, notably offset lithography, it must undergo a so-called screening process, in which tonal values are converted to relative sizes of screen dots. The present invention, and therefore also all discussion herein, relates solely to the generation of a digital image in terms of tonal values in a raster structure and assumes that this digital image (which is referred to herein as the output image) will be subsequently screened by any method known in the art.

Figure 4:
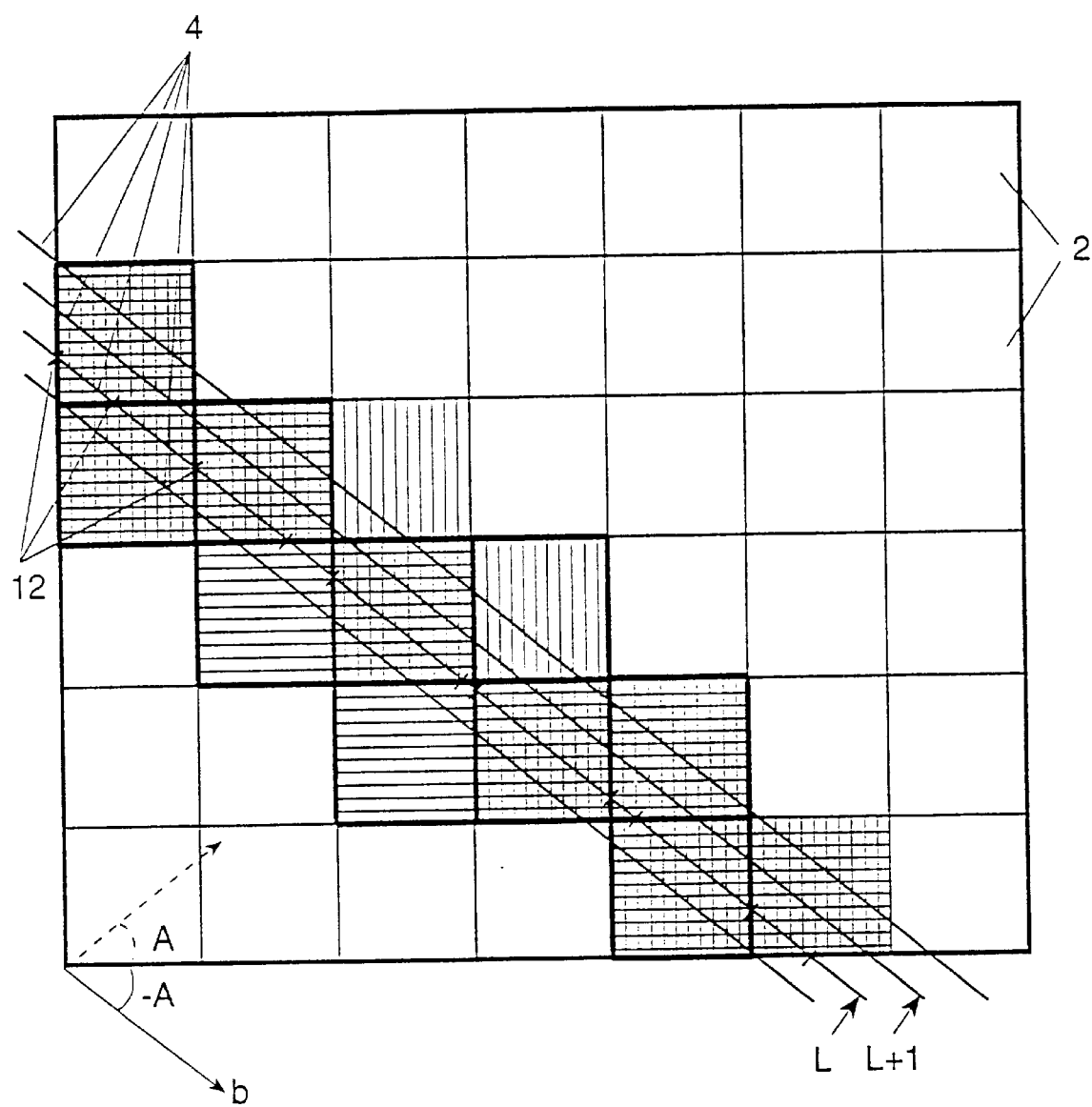
FIG. 4 is another detailed illustration of input image-plane geometry for a conversion method according to prior art.

Turning now to the case where a single contone image is to be merged into the output image rotated by angle A, reference is made to FIG. 4, where the lower left corner region of such a contone image is illustrated, again divided into rectangles 2 having the same meaning as those in FIG. 3. Also illustrated in FIG. 4 are the back-mapped versions of some output raster lines, denoted by 4. Clearly, these lines form an angle -A with the horizontal (assuming output raster lines to be horizontal). According to prior art—for example in a typical process based on the aforementioned Postscript model—this image would be rendered into a section of the output image, raster line by raster line, in effect as follows: The raster line is conceptually back-mapped into the image area as, say, one of the lines 4, denoted by L. All pixels through whose rectangles line L passes (at least within a section of the line bounded by a clipping path) are read out. These rectangles are shown in FIG. 4 shaded by horizontal lines. The values of these pixels are assigned to segments of the line that are correspondingly defined by intersection with the boundaries of their respective rectangles. Marks 12 along line L in FIG. 4 denote such intersection points and thus— the demarkation between successive segments. It is noted that applying the same procedure to the next output raster line, denoted by L+1, will generally result in a different set of rectangles, shown shaded by vertical lines, whose pixel values need to be read out. Although many pixels, shown shaded both horizontally and vertically, will be common to both sets, the need to thus read out from memory and convert a new sequence of values for each output raster line limits the available rate of output generation, as was pointed out in the background section.

Figure 5:
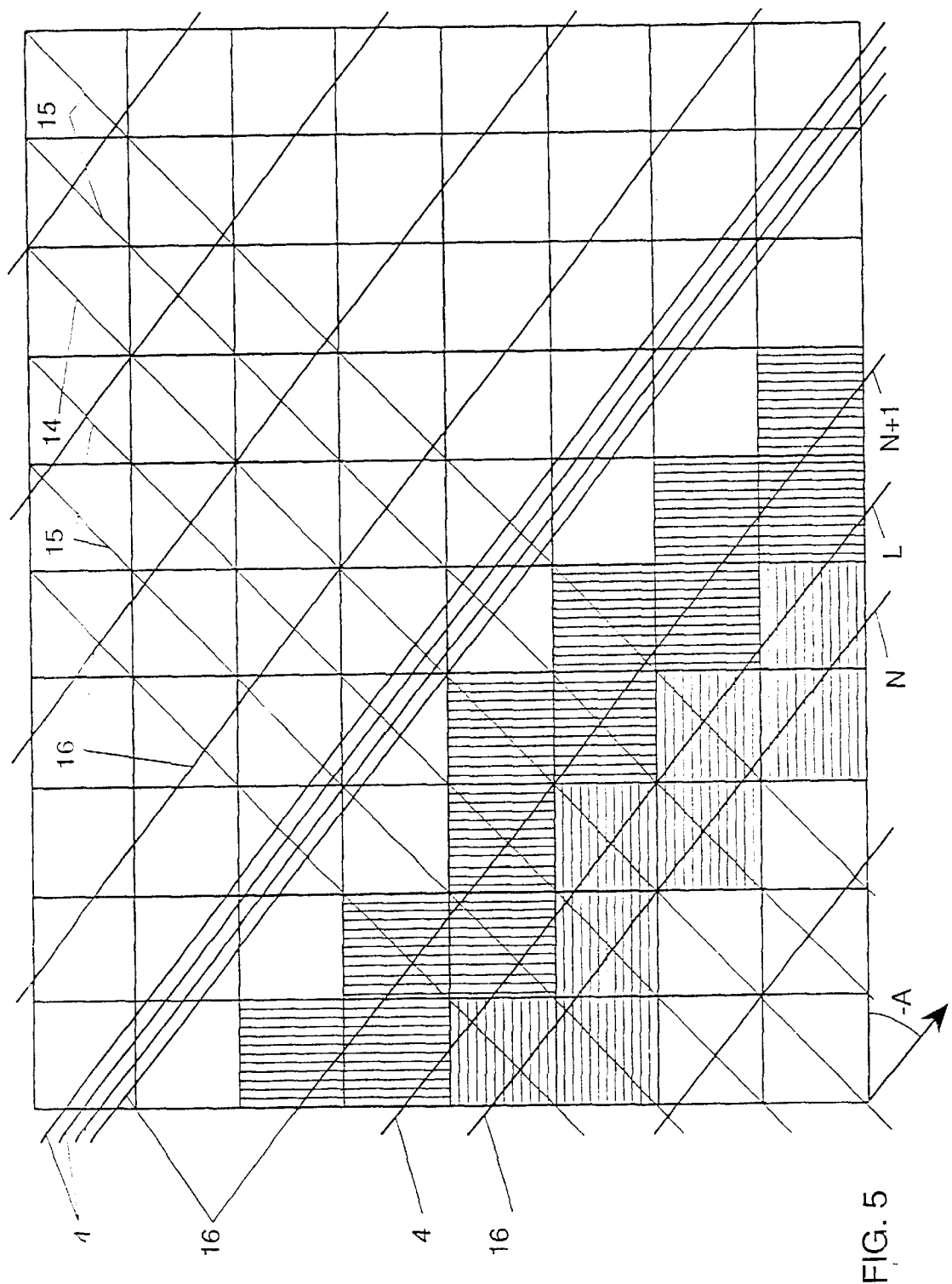
FIG. 5 is a full illustration of input image-plane geometry for a conversion method according to the present invention for the general case.

The present invention uses a radically improved approach, which will now be explained with reference to FIG. 5.

FIG. 5 depicts, again, the lower left corner of a contone image, with the same structure of rectangles as FIGS. 3 and 4, as well as some typical back-mapped output raster lines 4. Also drawn is a line 14, to be referred to as the main diagonal, passing through the lower-left corner of the array of rectangles, then through the upper-right corner of the first rectangle, then through the upper-right corner of the rectangle diagonally to the right and above the first one and so on. Through each corner thus traversed by the main diagonal there is drawn a line 16 parallel to the back-mapped output raster lines 4, which will be referred to as a master line. In general, for non-square images, additional raster lines are drawn so as to complete a set of master lines, all mutually parallel and spaced one diagonal of a rectangle apart, traversing all image pixel rectangles. Two adjacent typical master lines 16 are denoted by N and N+1 respectively. The rectangles traversed by line N are shown in FIG. 5 shaded by horizontal lines and those traversed by line N+1 are shown shaded by vertical lines. Because of the periodicity of the rectangular structure, the pattern of rectangles traversed by line N+1 is congruent to that traversed by line N over most of their lengths (i.e. excluding their ends), as can clearly be seen in FIG. 5 when comparing the two differently shaded areas. As can moreover be seen in FIG. 5, there are no rectangles common to both sets (i.e. none are doubly shaded) and there are no unshaded rectangles between the two sets. It may now be stated in general that all sets of rectangles traversed respectively by master lines are mutually exclusive and their union constitutes the entire image area. It may furthermore be observed that any back-mapped raster line, such as that denoted by L, lying between two adjacent master lines, such as in this case N and N+1, traverses rectangles, some of which belong to one set and some of which belong to the other set but none of which is outside the two sets. Obviously, if a back-mapped raster line exactly coincides with a master line, it will traverse exactly and only that master line's set of rectangles. Thus, the rectangles traversed by any back-mapped output raster line can be selected from at most two sets of rectangles, namely those traversed by the two master lines that straddle that line. It will be appreciated that the master lines need not pass through the corners traversed by the main diagonal as described above, but could be placed anywhere else, as long as they remain spaced one diagonal of a rectangle apart. It will also be appreciated that in the case that angle A is negative, the back-mapped raster lines in FIG. 5 will generally run from left to right in an upward direction, while the main diagonal will run from the lower right corner upward to the left; all the facts and relationships described above will however remain unchanged. The utilization of these facts and relationships lies at the basis of the present invention, as will now be described.

Figure 6A:
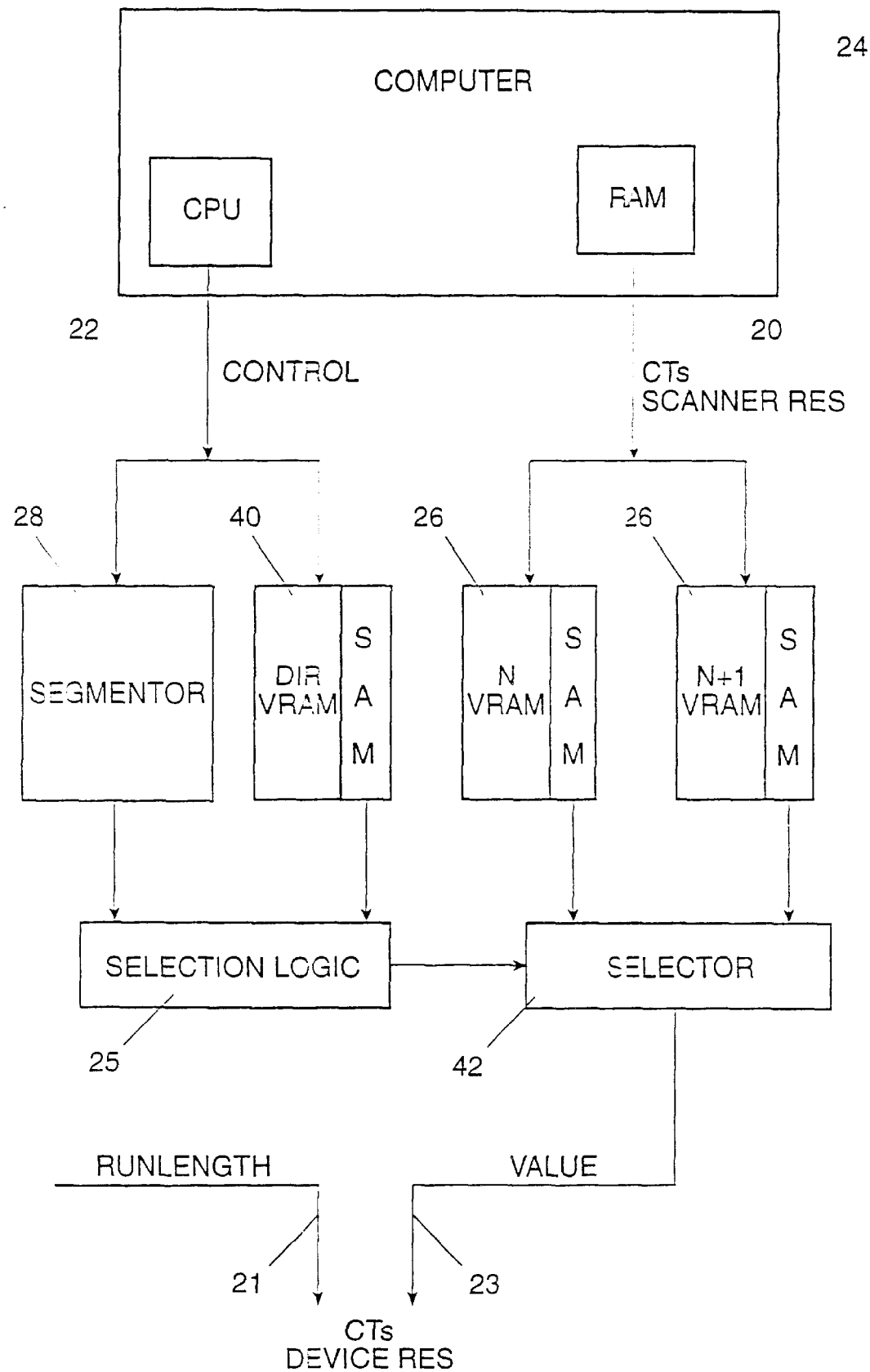
FIG. 6A is a block diagram of apparatus to carry out image conversion according to the present invention.

FIG. 6A depicts a block diagram of a preferred embodiment of a digital apparatus to convert a single contone image, rotated by an angle A, into output image representation. The given contone image is stored, as an array of pixel values, in a RAM 20, which is associated with a CPU 22, both being part of a computer 24.

Figure 7A:
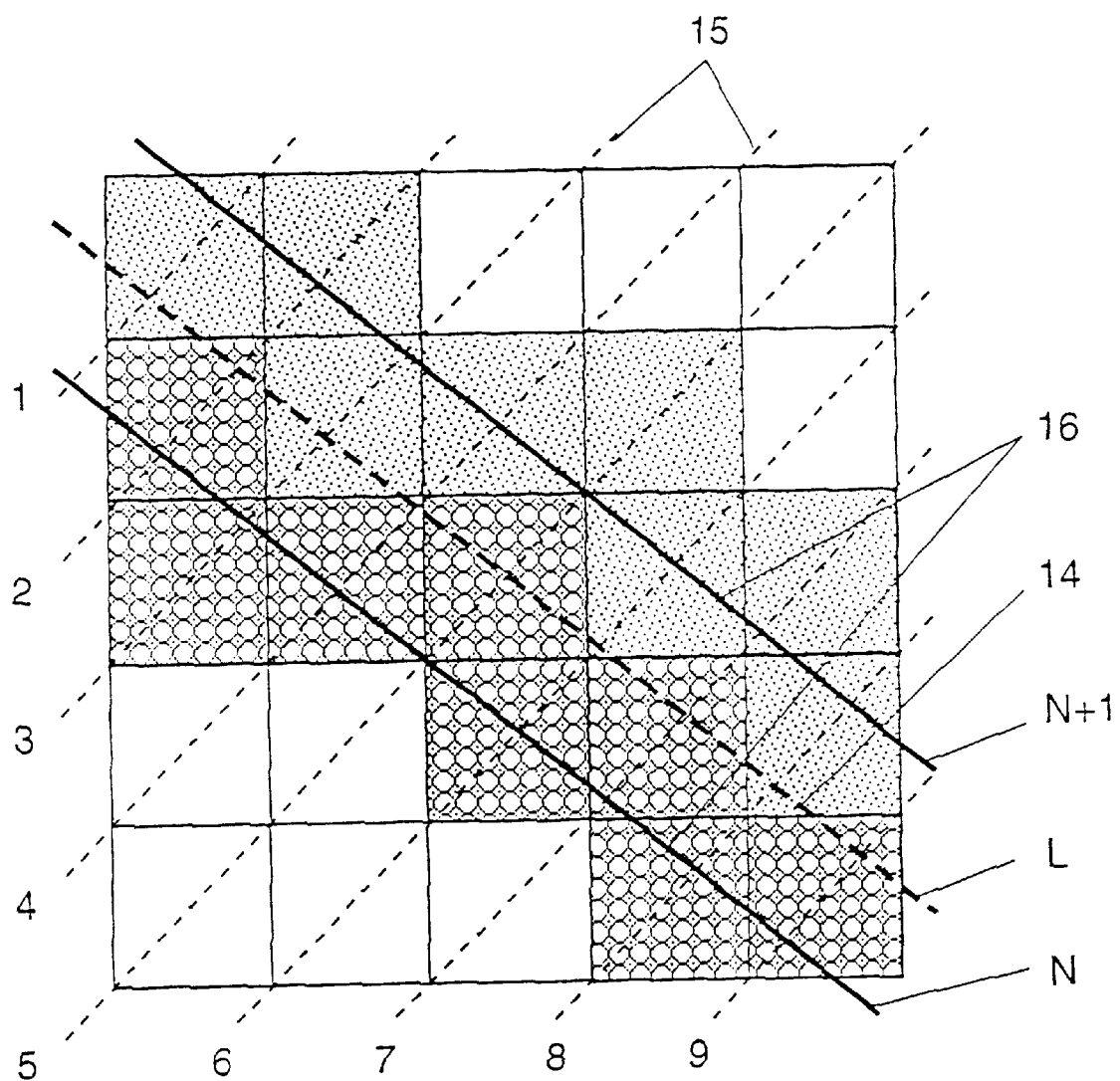
FIG. 7A is an illustration of certain features in the input image-plane geometry for a conversion method according to the present invention.

Reference is now made to FIG. 7A, which again depicts a portion of an input image, divided into pixel squares, with a pair of adjacent master lines 16, N and N+1, straddling a typical back-mapped raster line 14, marked L. The squares traversed by N and N+1 are again shown differentially shaded. Also drawn, as light dashed lines, is a set of parallel lines, inclined at 45 degrees to the coordinate axes, each being collinear with the diagonals of the pixel squares lying in one diagonal row, adjacent lines being associated with adjacent diagonal rows. These lines will be referred to as diagonals. The diagonals in this example are shown sequentially numbered from 1 to 9. It will be noticed that line no. 5 is the main diagonal as defined above. It will also be noticed that, in general, the total number of diagonals, nd, is equal to the number of pixels in the height of the image, h, plus their number in the width of the image, w, minus one; i.e. nd=h+w−1. It will further be noticed that the rectangles sequentially traversed by a master line, or any back-mapped scan-line, correspond one-to-one to consecutive diagonals. For example, the squares sequentially traversed by master line N (all uniquely shaded in FIG. 7A) correspond each to one of the diagonals 1, 2, 3 etc. in sequence (whereby traversal through a corner is arbitrarily associated with the square above and to the right thereto).

The pattern of rectangles sequentially traversed by a master line or back-mapped raster line, can be characterized in terms of the general direction of each such rectangle from the immediately preceding one in the order of traversal—the direction being either horizontal (H) or vertical (V). Thus, for example, for the line N in FIG. 7A the pattern, starting from the square that corresponds to diagonal 2 and ending with that corresponding to diagonal 9, is HVHHVHVH. A pattern thus represented will therefore be referred to as a direction pattern. It will now be noticed that the direction pattern of any master line, say N, between any two diagonals is identical to that of any other master line, say N+1, between the same diagonals. For example, in FIG. 7A the pattern between diagonals 2 and 8 is HVHHVHV identically for both master lines shown. For each transition from one diagonal to the next, there is thus a unique master line direction. A master direction pattern of length nd−1 can thus be defined to cover the total number of diagonals in the image area. It will be noticed, however, that any one master line within the image bounds has, in general, a direction pattern shorter than nd−1, being identical with a segment of the master direction pattern.

Preliminary to the process of raster conversion, the master direction pattern is obtained and stored as a binary sequence in a VRAM 40 (FIG. 6A), referred to as the direction VRAM.

The process of raster conversion then proceeds for each group of adjacent output raster lines such that when back-mapped into the coordinates of the contone image, they lie between a particular pair of master lines; this pair of master lines and the corresponding group of raster lines will be referred to as being active. In the illustrative example (see FIG. 7A) a currently active pair of master lines is N and N+1. The locations of all pixels along each of the two master lines are computed sequentially, starting from the left edge of the input image, and using the appropriate segment of the master direction pattern. The values of these pixels are read out from RAM 20 (see FIG. 6A) and stored in sequence in VRAMs 26, denoted as N VRAM and N+1 VRAM respectively. Thus, the pixel values are stored in each VRAM 26 in the same sequence as the sequence of traversal of the master line through the corresponding rectangles. For rectangles located outside the image area no values need be stored.

The generation of each output raster line of the current group then proceeds as follows: First the line is back-mapped into the coordinates of the contone image. From this, two primary sequences are generated, relating to the rectangles traversed by it: One sequence is a current direction pattern, having a meaning similar to that described hereabove. The other sequence, to be referred to as the runlength sequence, consists of the lengths of consecutive segments along the output raster line, the segments delineated by intersections of the back-mapped line with the edges of the rectangles. From a comparison between the current direction pattern and the master direction pattern, a third, secondary sequence is generated—the selection sequence, indicating to which of the two stored mutually exclusive sets of values each pixel along the raster line belongs.

The computation described hereabove is carried out in the segmentor 28 (FIG. 6A). The segments sequence is available at port 21. The current direction pattern is fed to the selection logic 25, where it is compared, bit for bit, with the appropriate segment of the stored master direction pattern (which is read out from the direction VRAM 40 in the same order), causing a selection sequence to be generated according to the following rule: If the two direction bits are equal, the selection is to remain unchanged; that is—the next pixel value is to be taken from the same VRAM as the previous pixel value, whether that VRAM is N or N+1. If the two direction bits are unequal, the selection switches; that is—if the previous pixel value was taken from N VRAM then the next pixel value is to be taken from N+1 VRAM, and vice-versa.

Figure 7B:
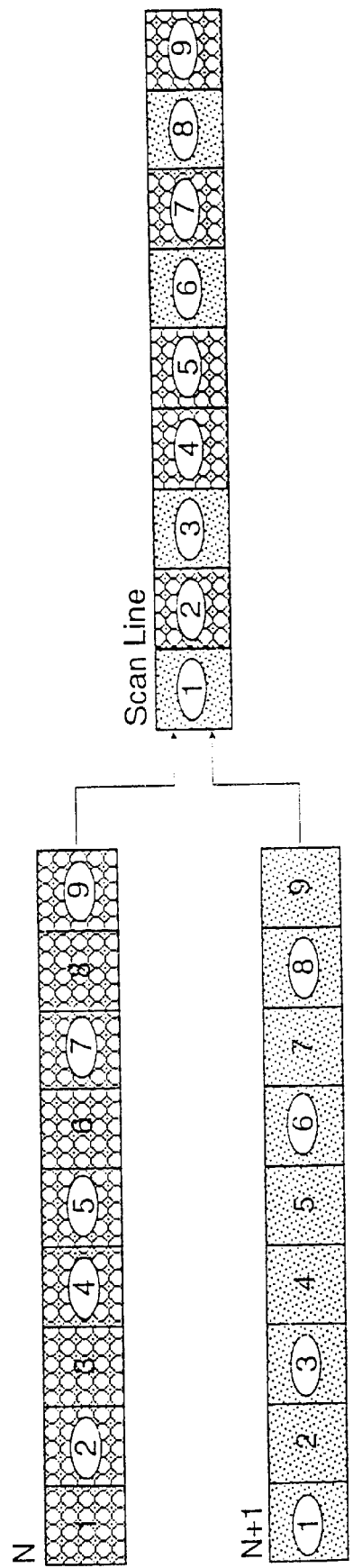
FIG. 7B is an illustration of an example of pixel value selection as used in the conversion method according to the present invention.

Concurrently with this computation, the pixel values in each of the two VRAMs are transferred, a row at a time, into the corresponding serial output buffers. From the output buffers the values are read out sequentially, synchronized with the generation of the current direction pattern in terms of the shared corresponding diagonal. The next pixel value, as selected by the selection sequence, is transferred from one of the two VRAMs 26 by selector 42. The resulting pixel sequence is made available at a port 23. FIG. 7B illustrates the process for the segment of line L shown in FIG. 7A. The left side of the drawing represents the two output buffers, holding corresponding values of pixels along master lines N and N+1. The identifying textures are identical with those of corresponding squares in FIG. 7A and each cell is marked with the number of the diagonal traversing the corresponding square. The right side of FIG. 7B shows the selected sequence for line L, appearing at port 23; the drawn textures correspond to those of the squares traversed by the line.

The runlength sequence and the pixel sequence are fed out of their ports 21 and 23 respectively and, with corresponding values paired, are made available to the next station in the system, where the current output raster line will be further prepared. Usually this involves the combination of the converted contone image with a clipping path or an overlying LW image and, possibly with other contone images, as will be explained herebelow for the more general case. Alternatively, the next station could be the one that carries out the screening process.

After one raster line has thus been generated, the next one of the current group is generated by the same procedure. It is noted that the same pixel data, stored in the pixel VRAMs 26, is used for generating the pixel sequence for all lines in a group (falling between adjacent master lines); only after the last raster line of a group has been generated, is the data in one of the VRAMs changed for the next group. What preferably happens in practice is that the VRAM designated N+1 becomes, in effect, N and another VRAM, which has meanwhile been loaded with pixel data corresponding to the next master line, assumes the role of N+1. It is noted that, in general, a plurality of output raster lines are generated for each set of input image pixels corresponding to a master line and being retrieved from memory (and loaded into a VRAM).

The use of a hardware architecture such as that of a VRAM in carrying out the conversion is a feature of the present invention. Typically a VRAM consists of a dual-port RAM, with one port coupled to a SAM (serial-access memory), which acts as a serial output buffer. The RAM is row-oriented, the length of each row being typically equal to the length of the SAM. Any one row of data in the RAM can be loaded in parallel, sequence intact, into the SAM, whence it can be read out serially at a very fast rate. The other port of the RAM permits loading it with external data (as well as reading data out) in normal random access mode.

There are several ways to organize the pixel values in each VRAM. In a particular preferred embodiment, data for one complete master line are divided into groups of $2^i$ values (except at the ends of the master line, where the groups may contain less than $2^i$ values) and stored sequentially in rows of the VRAM, which are $2^i$ bytes wide (where i is an integer). During readout the rows are transferred in sequence into the output SAM, which is $2^i$ bytes long. A single VRAM may contain more than one complete pattern and it may be loaded with the data for the next master line while the data for the current raster lines are still being read out.

It will be appreciated that a memory system functioning in a manner similar to that described hereabove can also be configured out of appropriate separate components and similarly used for the image conversion process, but VRAMs, by virtue of their SAMs, which can serially output the data stored in any row of the memory at very high speed even while new data is loaded, are particularly advantageous, as well as cost-effective.

In the more general case, a page is composed out of a number of linework images and a number of contone images. The various contone images may have different resolutions and some or all of them may have to be rotated. The method described hereabove may be applied to all the contone images. In the context of the PostScript model for page assembly, the method is applied separately to each contone image as a whole, or to each of the bands into which it may be divided, in the manner described hereabove; each resulting raster line is clipped by the applicable clipping path and written into the cumulative frame- or band- buffer memory, respectively. In the context of the CEPS model for page assembly, the method is modified so as to use the hardware to even greater advantage, as will now be described with reference to FIGS. 6B and 8.

Figure 6B:
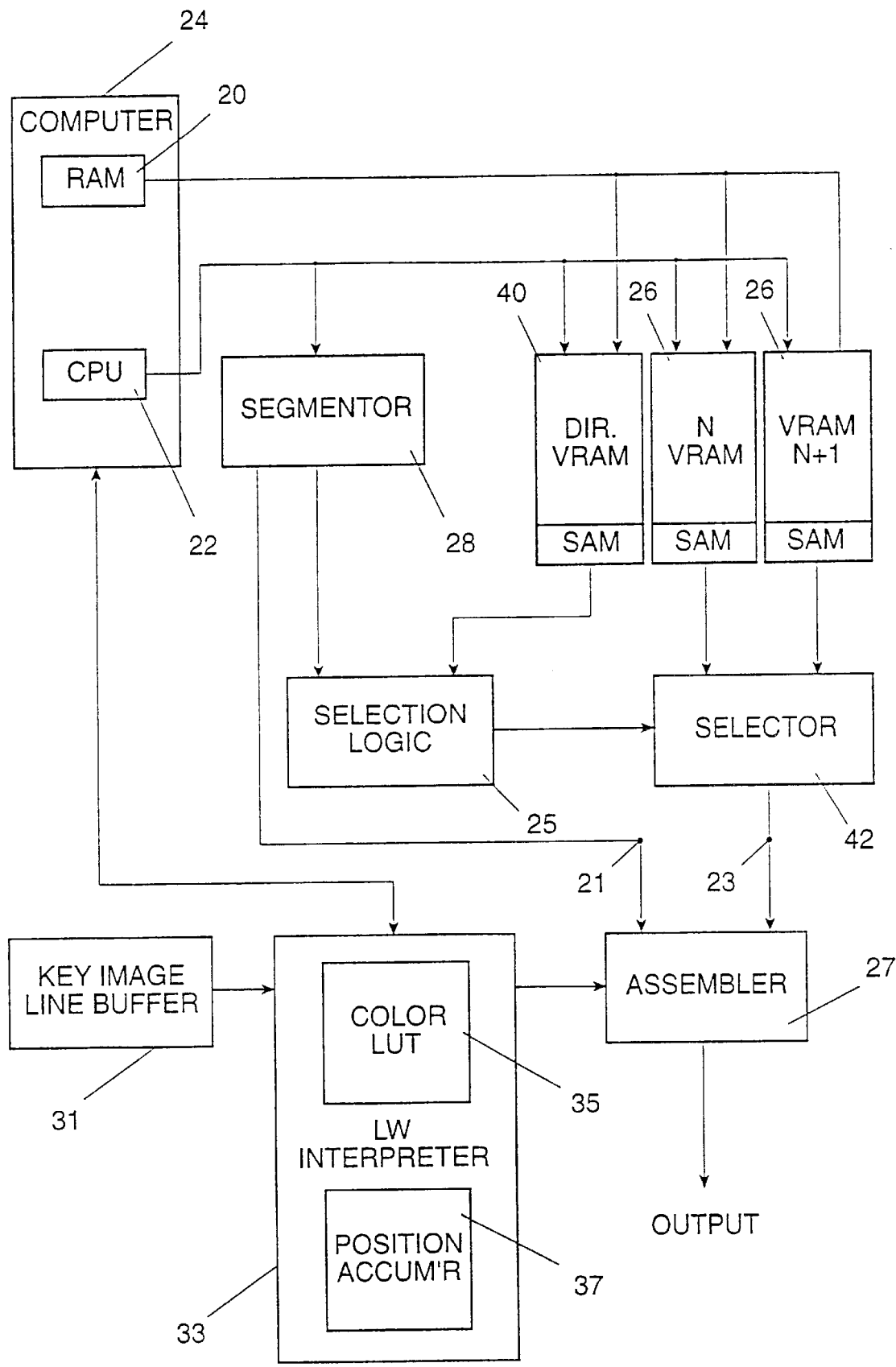
FIG. 6B is a block diagram of apparatus to carry out image conversion and page assembly according to the present invention.
Figure 8:
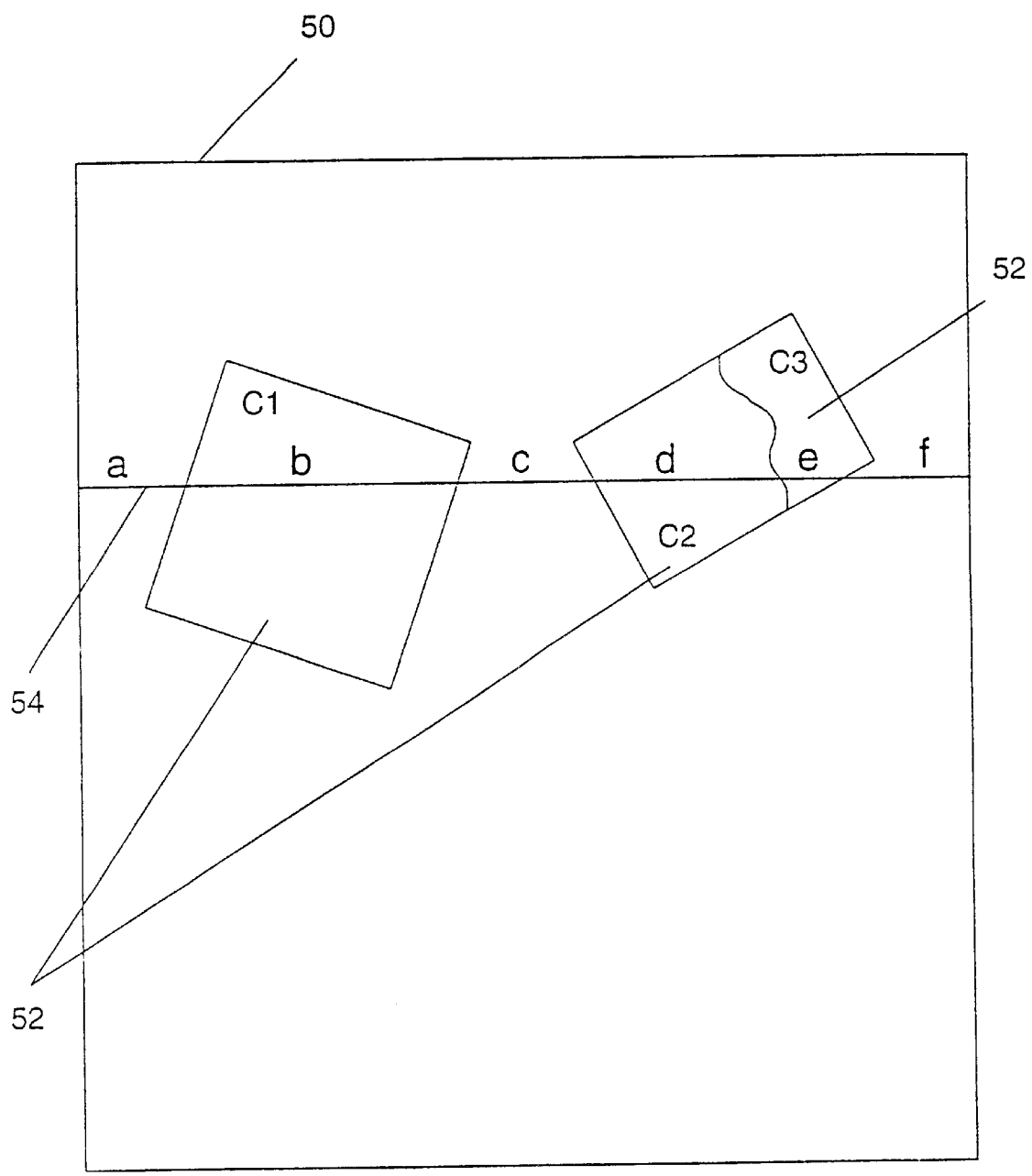
FIG. 8 is an illustration of output image-plane geometry, showing an example of layout of component images.

The LW images are first merged into a single intermediate LW image, to be referred to as the key image, by conventional means. FIG. 8 illustrates by example an output image of a page 50 with three contone components 52, marked C1, C2 and C3. The CT components C2 and C3 are seen to mutually abut; the boundary between them, as well as all other boundaries of the CT components, are defined by the key image (not shown). The CT components are derived, in a manner to be described herebelow, from corresponding input images, which are, for example, stored in RAM 20 (FIG. 6B).

In a preferred embodiment the system of FIG. 6A is modified to become that of FIG. 6B, to effect both raster-converting the CT images and merging them, as follows.

The key image data, consisting of pairs of color-code and runlength values, is fed out through line buffer 31 to LW interpreter 33. Within the latter, the color codes are converted in a LUT 35 into tone values, which together with the runlength values are fed to the page assembler unit 27. Where the color code is that of a transparent color, the LUT 35 issues a selection signal for a specific contone image. The runlengths are also fed to a position accumulator 37 within the LW interpreter 33, which keeps track of current position along the current raster line. The position signal from accumulator 37 and the selection signal from LUT 35 are fed to the CPU 22, which accordingly issues SAM loading instructions to the CT VRAMs 26 and initializes the segmentor 28. The page assembler unit 27 combines the LW data received from LW interpreter 33 with the CT data received through ports 21 and 23 and outputs a stream of runlength- and tone value pairs that constitutes the signal for the raster lines of the composed page image.

At the beginning of the output page generation, the initial variable values, including master direction pattern, for each CT image are computed, as described above for the single image case. The master direction pattern of each image is stored in separate sections of the direction VRAM 40.

Generation of the output image, as exemplified in FIG. 8, will be described for a typical raster line, such as represented by horizontal line 54. The raster line 54 is back-mapped into each input CT image plane whose corresponding component is traversed by that line in the page image; in our illustrative example they are C1, C2 and C3. For each such input image, the pixel values along each of the two master lines straddling the back-mapped raster line are stored sequentially in the corresponding one of the two pixel VRAMs 26; within each VRAM the values from the various input images are stored in separate sections. It is again noted that for each input image the values along any master line need be read out from RAM 20 and written into a VRAM only once, namely when a back-mapped raster line is found to lie beyond one of the previous master lines; a group of subsequent raster lines can then use the same stored values for that image.

Generation of the output raster line data now proceeds as follows: In each of the two pixel VRAMs 26 the pixel values are transferred, one row (or, near edge of image, part of a row) at a time, from the RAM onto the SAM, whence they are output serially into the selector 42. The rows are transferred in a sequence that corresponds to the natural sequence of the pixels within each image, as well as to the sequence of the component images along the raster line within the page image. As a result, the pixel values are fed out from each SAM in the exact order in which they should occur in the page image. Corresponding segments of the master direction patterns of the various contone images are likewise stored in the direction VRAM 40 and read out in sequence and in the proper order of the corresponding images. As controlled by the CPU 22, in accordance with signals from LW interpreter 33, the segmentor 28 generates a runlength sequence and a current direction pattern for the appropriate contone image, essentially as described hereabove for the single-image case. The current direction pattern is compared, again similarly to the single-image case, with the sequential master direction pattern from direction VRAM 40, to produce a selection sequence. The pixel value selector 42 then selects pixel values from between the output streams of the two pixel VRAMs 26 and outputs them to port 23.

The page assembler unit 27 operates on the key-image data for the current raster line, obtained from buffer 31, as follows: For non-transparent color values in the key image, the LW runlengths are passed through, together with the tone values from LUT 35. Where a transparent color appears, runlength- and tone values for the corresponding CT image are obtained from ports 21 and 23, respectively. In our example (FIG. 8) for raster line 54, the assembler will first pass through, for the line section marked a, runlength- (as well as tone-) values from the key image, then, for the line section marked b, it will pass the runlength- and tone values for image C1; similarly it will pass through LW data over sections c and f and will pass the runlength- and tone values for C2 and C3 over sections d and e respectively—all in the order shown (left to right). At the trailing edge of a CT area the runlength obtained from port 21 is modified by page assembler 27 to conform to the exact position indicated by the key image data (reflecting the sharp clipping that may occur even within a nominal pixel area). It is noted that at the leading edge of a CT area the runlength obtained from port 21 needs no modification, since at this location the segmentor 28 is initialized by CPU 22 to output the correct runlength, as described hereabove. It is further noted that at the boundary between two abutting CT components, the last pixel of the first component (e.g., of C2 in FIG. 10) and the first pixel of the second component (e.g., C3) may both be thus affected; also, the values of both pixels will be fed, in correct order, from the SAMs of VRAMs 26 and from the selector 42, each value being paired with the runlength for the corresponding part of that pixel's area in the composite image.

It is thus appreciated that the methods, apparatus and procedure described hereabove can accomplish both tasks enumerated before, namely raster converting contone images and merging them into a page image, in a single and fast process. It will also be appreciated that essentially the same methods can be advantageously carried out by other apparatus or within an imaging model different from the CEPS model and that, furthermore, many variations, modifications and other applications of the invention may be made.

What is claimed is:

1. A method for converting a digital representation of an image from a first raster into a second raster, the representation in the first raster being in terms of pixel values at pixel positions forming points in a two-dimensional array, the representation in the second raster being in terms of pixel values along parallel raster lines, the resolution in the second raster being substantially higher than the resolution in the first raster and the orientation of the image in the second raster being at any angle A with respect to the orientation of the image in the first raster, the method comprising the steps of—

(a) determining the pixel positions in the first raster that correspond to a group of adjacent raster lines of the second raster;

(b) retrieving the values of the pixels whose positions were determined in step (a) and storing the retrieved values in at least one serially organized buffer memory; and (c) for each raster line of said group of adjacent raster lines, reading out the stored values from said at least one buffer memory in sequence and selecting from the thus read out stored values those values that correspond to the raster line.

2. The method of claim 1, whereby the two-dimensional array is a regular cartesian array, further including the steps of:

dividing the image area in the first raster into a plurality of elementary rectangles, with boundaries parallel to the coordinate axes of the first raster, so that there is a one-to-one correspondence between said elementary rectangles and the pixel positions; and defining over the image area in the first raster a plurality of master lines, which are lines parallel to any back-mapped line of the second raster, their number and their mutual spacing being such that together they traverse all of said elementary rectangles;

and wherein in step (a)— said group of adjacent raster lines is selected so as to contain the largest number of raster lines that, when back-mapped to the first raster, lie entirely between a pair of adjacent master lines and said determining includes determining the pixel positions that correspond to those elementary rectangles that are traversed by said pair of adjacent master lines.

3. The method of claim 2, wherein:

the retrieved values of step (b) are stored in two of said serially organized buffer memories so that values that correspond to elementary rectangles traversed by each one of said pair of master lines are stored separately in a respective one of said two buffer memories; and in stop (c) the stored values are sequentially read out separately and synchronously from said two buffer memories to yield a steam of pairs of values, and said selecting includes selecting from each of said pairs of values along said stream one value that corresponds to a respective one of those elementary rectangles that are traversed by the back-mapped raster line.

4. The method of claim 3, wherein said master lines are furthermore spaced so that not more than one master line traverses any one elementary rectangle;

further including the step of determining a master sequence of directions in which each of said master lines traverses elementary rectangles and storing said master sequence in a buffer memory; and wherein step (c) includes the substeps of:

(i) determining a current sequence of directions in which the back-mapped raster line traverses elementary rectangles;

(ii) logically comparing said current sequence with said stored master sequence; and (iii) for each of said pairs of values along said stream, choosing said respective one of the elementary rectangles according to the results of substep (ii).

5. The method of claim 1, wherein any of said buffer memories includes a random-access memory and a serial access memory.

6. The method of claim 1, wherein any of said buffer memories is a VRAM.

7. A method for digitally generating an output image, the output image including a plurality of contone component images corresponding to a plurality of contone input images, each input image being represented in a first raster in terms of pixel values at pixel positions forming points in a two-dimensional array, the output image being represented in a second raster in terms of values along parallel raster lines, the resolution of the output image being substantially higher than the resolution of each of the input images, the orientation of each of the component images in the second raster being at any angle with respect to the orientation of the corresponding image in the first raster and the input images generally differing from each other in their resolution and in the orientation of their corresponding component images, the method comprising the steps of—

(a) providing a key image, represented in said second raster, which specifies for any segment along each raster line of the output image either a tone value or a mask code that determines from which one of said plurality of contone input images a pixel value should be obtained;

(b) for each contone input image and corresponding contone output image component—

(i) determining the pixel positions in the first raster that correspond to a group of adjacent raster lines of the second raster;

(ii) retrieving the values of the pixels determined in step (i) and storing the retrieved values in at least one serially organized buffer memory; and (c) for each raster line, reading out the stored values from said at least one buffer memory, values corresponding to various input images being read out in a sequence that reflects the sequence of corresponding mask codes along the raster line, and selecting from the thus read out stored values those values that correspond to the raster line.

8. The method of claim 7, whereby the two dimensional array is a regular cartesian array, further including, with respect to each contone input image, the steps of:

dividing the image area in the first raster into a plurality of elementary rectangles with boundaries parallel to the coordinate axes of the first raster, so that there is a one-to-one correspondence between said elementary rectangles and the pixel positions; and defining over the image area in the first raster a plurality of master lines, which are lines parallel to any back-mapped line of the second raster, their number and their mutual spacing being such that together they traverse all of said elementary rectangles;

and wherein in substep (i) of step (b)— said group of adjacent raster lines is selected so as to contain the largest number of raster lines that, when back-mapped to the first raster, lie entirely between a pair of adjacent master lines and said determining includes determining the pixel positions that correspond to those elementary rectangles that are traversed by said pair of adjacent master lines.

9. The method of claim 8, wherein:

for each contone input image and corresponding contone output image component, the retrieved values of substep (ii) of step (b) are stored in two of said serially organized buffer memories so that values that correspond to elementary rectangles traversed by each one of said pair of master lines are stored separately in a respective one of said two buffer memories; and in step (c) the stored values are sequentially read out separately and synchronously from said two buffer memories to yield a stream of pairs of values, and said selecting includes selecting from each of said pairs of values along said stream one value that corresponds to a respective one of those elementary rectangles that are traversed by the back-mapped raster line.

10. The method of claim 9, wherein said master lines are furthermore spaced so that not more than one master line traverses any one elementary rectangle;

step (b) further including the substep of determining a master sequence of directions in which each of said master lines traverses elementary rectangles and storing said master sequence in a buffer memory;

and wherein step (c) includes, with respect to each contone input image, the substeps of:

(i) determining a current sequence of directions in which the back-mapped raster line traverses said elementary rectangles;

(ii) logically comparing said current sequence with said stored master sequence; and (iii) for each of said pairs of values along said stream, choosing said respective one of the elementary rectangles according to the results of substep (ii).

11. The method of claim 7, wherein any of said buffer memories includes a random-access memory and a serial access memory.

12. The method of claim 7, wherein any of said buffer memories is a VRAM.

13. The method of claim 1, wherein step (c) further includes concurrently determining the length of the segment along the raster line that corresponds to each of the thus selected values.

14. The method of claim 9, wherein in substep (ii) of step (b) values retrieved from all contone input images are stored in the same said two buffer memories.

* * * * *

UNITED STATES PATENT AND TRADEMARK OFFICE
CERTIFICATE OF CORRECTION

PATENT NO.: 5,946,426
DATED: August 31, 1999
INVENTOR(S): CARLEBACH

It is certified that error appears in the above-identified patent and that said Letters Patent is hereby corrected as shown below:

```
 Title page, item [75], should read--
Inventor: Ephraim A. CARLEBACH --
```

Signed and Sealed this

Twenty-fifth Day of July, 2000

*Attest:*

Q. TODD DICKINSON

*Attesting Officer*    *Director of Patents and Trademarks*